United States Patent [19]
Lee

[11] Patent Number: 5,994,875
[45] Date of Patent: Nov. 30, 1999

[54] BATTERY CHARGING APPARATUS AND METHOD WITH CHARGING MODE CONVERTIBLE FUNCTION

[75] Inventor: Chang-Hum Lee, Anyang, Rep. of Korea

[73] Assignee: SamSung Electronics Co., Ltd., Suwon, Rep. of Korea

[21] Appl. No.: 08/881,569

[22] Filed: Jun. 24, 1997

[30] Foreign Application Priority Data

Jun. 24, 1996 [KR]  Rep. of Korea ..................... 96-23162

[51] Int. Cl.$^6$ ................................................. H01M 10/46
[52] U.S. Cl. ........................................... 320/132; 320/136
[58] Field of Search ..................................... 320/125, 128, 320/132, 134, 136, 139, 142, 145, 160, 162, 163, FOR 119, FOR 120, FOR 121, FOR 138

[56] References Cited

U.S. PATENT DOCUMENTS

| | | |
|---|---|---|
| 4,390,828 | 6/1983 | Converse et al. . |
| 4,607,208 | 8/1986 | Vreeland . |
| 4,609,861 | 9/1986 | Inaniwa et al. . |
| 4,667,143 | 5/1987 | Cooper et al. . |
| 4,876,495 | 10/1989 | Palenisamy et al. . |
| 5,049,804 | 9/1991 | Hutchings . |
| 5,175,485 | 12/1992 | Joo . |
| 5,254,932 | 10/1993 | Bittar et al. . |
| 5,274,321 | 12/1993 | Matsuda . |
| 5,408,170 | 4/1995 | Umetsu et al. . |
| 5,442,274 | 8/1995 | Tamai . |
| 5,576,608 | 11/1996 | Nagai et al. . |
| 5,637,981 | 6/1997 | Nagai et al. . |

*Primary Examiner*—Edward H. Tso
*Attorney, Agent, or Firm*—Robert E. Bushnell, Esq.

[57] ABSTRACT

A battery charging apparatus for use with batteries that require charging in a constant current mode and/or constant voltage mode. The charging apparatus includes a constant current charging control circuit converting the charging current supplied with the battery into a voltage signal and applying the voltage signal to a feedback input terminal of a switching regulator in response to a charging speed control signal F_Q, and a constant voltage charging control circuit providing a control signal to the feedback input terminal for controlling constant voltage charging if the battery voltage level has reached a preset voltage level, whereby a constant voltage charging is possible during the charging operation in response to a charging mode selection signal CHG_MOD. A microcomputer produces the charging mode selection signal CHG_MOD when it is detected the charging voltage of the battery in the constant current mode and the detected voltage reached to a preset level in order to convert the charging mode into the constant voltage mode. Further, a charging speed control signal F_Q is produced to enable the switching regulator to perform quick charging operation. With this arrangement, the constant voltage (CV) charging mode can be performed when the battery is in the preset condition, regardless of type of batteries. In addition, by provision of a protection circuit, possible damage of the CV charging control circuit due to the excessive static or surge is effectively prevented.

20 Claims, 6 Drawing Sheets

BATTERY CHARGING APPARATUS AND METHOD WITH CHARGING MODE CONVERTIBLE FUNCTION

CLAIM FOR PRIORITY

This application make reference to, incorporates the same herein, and claims all benefits accruing under 35 U.S.C. §119 through my patent application entitled A BATTERY CHARGING APPARATUS WITH CHARGING MODE CONVERTIBLE FUNCTION earlier filed on the 24$^{th}$ day of June 1996 in the Korean Industrial Property Office, and there regularly assigned Ser. No. 1996/23162.

FIELD OF THE INVENTION

The present invention relates to battery charging processes and apparatus, and, more particularly, to battery charging processes and circuits used in portable computers for charging batteries in constant current modes and constant voltage modes.

BACKGROUND OF THE INVENTION

Recently, rechargeable batteries, i.e., secondary batteries, have been widely used to provide electrical power for driving battery powered electronic appliances such as, by way of example, portable radio cassette players, portable computers, camcorders, cellular telephones and other devices. Alkaline batteries such as nickel cadmium (Ni—Cd) or nickel metal hydride (Ni—MH) batteries have been generally used as the secondary battery. Recently, lithium ion (Li-ion) batteries with an organic electrolytic cell have gained popularity in high-end portable electronic devices because they exhibit high energy density, low temperature characteristics, and stable storage capability.

Rechargeable batteries require an electronic charger for recharging depleted batteries. A charger should include an internal charger circuit incorporated into the battery powered appliance. A charger will begin charging the battery whenever the device is powered by alternating current (i.e., AC) power. External battery chargers accepting one or more batteries to be charged, are equipped with an independent power supply and connectors.

Although rechargeable batteries have various types of battery chemistry, battery pack voltage, and battery pack capacity, there have been few methods of charging the batteries adopted in battery chargers. Generally, the charging method is either a constant voltage charging process or a constant current charging process. Constant voltage charging applies a constant voltage that is higher in amplitude than the nominal voltage of the battery across the terminals of a battery. Constant voltage charging process is typically used for charging a backup battery where frequent charging and discharging is not occurring. The charging voltage is continuously applied to the battery. On the other hand, the constant current charging process applies a constant current to the battery irrespective of any increase in the voltage across the terminals occurring as the charging progresses. Constant current charging is useful for rapidly charging a battery. Constant current charging however, requires a time limit in order to avoid damage of the battery due to overcharging.

Except those used in the portable radio cassette players, most battery chargers use a constant voltage charging process because it is simple in construction and is relatively inexpensive. This charging process requires relative long time, approximately about ten hours. Thus, constant voltage charging processes can be ineffective for portable use of the appliance powered by batteries.

In an effort to provide a more rapid charging process with battery protection, a charging mode convertible type charger has been developed. This charger performs charging operations in the both constant current mode and in the constant voltage mode. This type of charger starts charging the battery in a constant current mode when the battery is discharged in order to provide a fast charging operation, and automatically converts to a constant voltage mode at a predetermined charging level in order to complete a typical charging operation. Thus, rapid charging is provided while avoiding damage to the battery due by allowing the battery to remain connected to the charger for an excessively long time.

Some circuit designs such as the *Apparatus For Controlling Charging Of A Storage Battery* of Yeong J. Joo, U.S. Pat. No. 5,175,485 seek to initially apply a constant current, and then a constant voltage when the voltage across the terminals of a battery reach a desired value. Recent circuit designs such as the *Rechargeable Battery Charging Method* of M. Tamai, U.S. Pat. No. 5,442,274, have used hysteresis charging to a set value, followed by constant voltage charging. Other recent efforts in the art include the *Method For Charging Secondary Battery And Charger Used Therefor* by T. Nagai, *et alii*, U.S. Pat. No. 5,576,608 and the *Method For Charging A Secondary Battery And Charger Used Therefor Using Constant Current And Constant Voltage* by T. Nagai, *et alii*, U.S. Pat. No. 5,637,981, for converting after detection of various characteristics from a constant current to a constant voltage that is equal to the fully charged voltage.

In a constant current charging process, rapid and full charging is possible within a time limit during which a constant current is applied to the battery. In the mode convertible type charging process, initial charging is performed in the constant current mode for a predetermined time period, and then the charging operation is switched to the constant voltage mode, so that a full charge of the battery is achieved with the charging voltage being constantly maintained.

Ni—Cd and Ni—MH batteries can require the constant current charging mode, while Li-ion batteries require both the constant charging mode and the constant voltage charging mode. In the constant current charging mode, the end point of time at which the battery must cease its charging is determined by detecting an increase in the terminal voltage of the battery when the battery is fully charged. There is some difficulty in detecting the exact charge end point, because the full charge time varies with the residual capacity of the battery.

In a specific rapid charger, the charge time is determined by detecting voltage drop across the battery terminals because some amount of current is discharged from the battery when charging begins. The charge time is determined in accordance with an internal charging program. This method is difficult because the full charging of a battery can not be assured during the preset charging time due to the fact that the preset charging time does not reflect aging of the battery. Moreover, unless the battery to be charged is made by the manufacturer of the charger, the full charge time necessary for the battery can not be uniformly provided to the battery. Consequently, the terminal voltage of the battery being charged varies with the residual capacity and degree of aging of the battery. The conventional battery charger has endeavored to provide a compromise between rapid full charging and protection of the batteries.

A conventional charger for charging a Li-ion battery by using both a constant voltage charging process and a constant voltage charging process supplies a charging current to the battery by controlling the current or voltages between the output of a switching regulator and the battery being charged. This mode convertible type of battery charger unnecessarily consumes power because it always performs a constant voltage charging operation. When a Li-ion battery is being charged, the constant voltage charging mode is only necessary for supplemental charging subsequent to the constant current charging. Moreover, the constant voltage control circuit of the charger is apt to be damaged by the occurrence of static, noise or surges when the battery pack is either mounted on or detached from the appliance.

SUMMARY OF THE INVENTION

It is therefore an object of the present invention to provide an improved mode convertible battery charging process and battery charger.

It is another object to provide a mode convertible battery charging process and charger able is to provide constant voltage charging when necessary during a constant current charging mode, irrespective of the type of battery being charged.

It is another object to provide a mode convertible battery charging process and battery charger able to protect the charging control circuits from being damaged by unexpected electrical shocks.

According to one aspect of the present invention, there is provided a battery charging process and a battery charger for use with batteries required to be charged in a constant current mode and/or constant voltage mode. This uses a switching regulator generating a switching voltage from a DC voltage source; a constant current charging controller for detecting the current of the DC output provided by the switching regulator to produce a charging control signal for enabling the switching regulator to operate in the constant current mode; a battery detector for detecting the voltage level of the battery; a second controller for producing a charging mode selection signal, a charging speed control signal, and a charging enable signal in response to the voltage level detected from the battery detector; a charging speed controller for enabling the switching regulator to perform fast charging or quick charging operations in response to the input level of the charging speed control signal; a constant voltage charging controller for generating a control signal at the feedback input terminal of the switching regulator in order to operate the switching regulator in the constant voltage charging mode whenever the battery voltage level has reached a preset voltage level; a protection stage for preventing the constant voltage charging control circuit from being damaged by an excessive surge voltage; and a charging mode selector for enabling the constant voltage charging control circuit to operate in response to the charging mode selection signal.

Preferably, the constant current charging controller includes a resistor for detecting the output current of the switching regulator applied to the battery, and a comparator for amplifying the voltage drop at the resistor as much as the voltage gain thereof and for supplying the amplified voltage with the feedback input terminal of the switching regulator.

The charging speed controller includes a switching transistor having a base electrode connected with the charging speed control signal input via resistors, and a collector electrode coupled with the feedback input of the switching regulator.

Also, the constant voltage charging controller includes a voltage divider for detecting the charging voltage of the battery, a reference voltage generator, a comparator for producing the mode converting signal when the divided voltage is higher than the reference voltage, and a transistor for providing the charging voltage with the feedback input terminal of the switching regulator in response to the mode converting signal.

The protection stage includes a first transistor switched on in response to the high level signal of the charging mode selection signal, and a second transistor switched on in response to the turn on state of the first transistor to provide the charging voltage with the constant voltage charging controller.

The charging mode selection means includes a transistor for connecting, or disconnecting, the output of the constant voltage charging controller with the feedback input terminal of the switching regulator in response to the charging mode selection signal. Also, the charging mode selector includes a diode for blocking current flow from the output of the constant current charging controller to the output of the constant voltage charging controller.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1A:
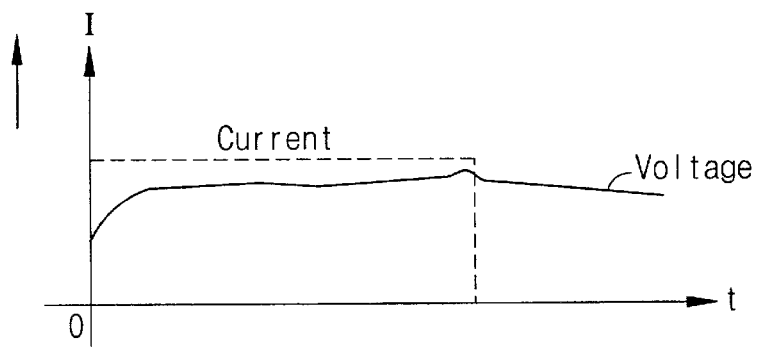
FIG. 1A is a graph showing variations in the amplitude of voltage as a function of time while a battery is charged in a constant current charging mode.
Figure 1B:
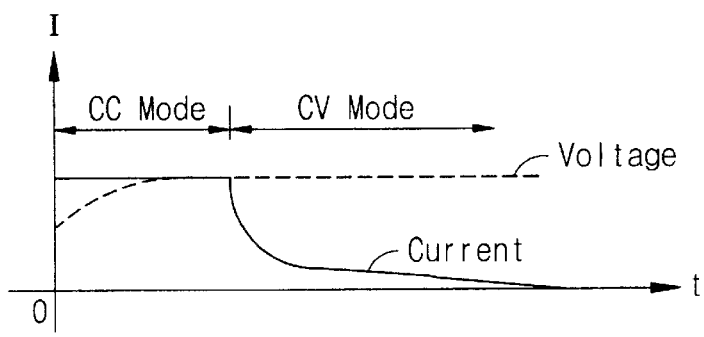
FIG. 1B is a graph showing variations in amplitude of voltage and current over time while a battery is successively charged in a constant current and then a constant voltage charging mode.

As shown in FIG. 1A, prior art constant current charging processes were able to provide a rapid and full charging of a battery within the time limit (shown by the dashed line) during which a constant current is applied to the battery. As shown in Fig. 1B, in the mode convertible type charging process, when initial charging is performed in the constant current (CC) mode for a predetermined time period and then the charging operation is changed to a constant voltage (CV) mode, a full charge of the battery is achieved with the charging voltage being maintained constantly.

In this context, the Ni—Cd and Ni—MH batteries can require the constant current charging mode, and the Li-ion batteries require both the constant current charging mode and the constant voltage charging mode. In the constant current charging mode, the end point of time at which the battery must cease to be charged is determined by detecting an increase of the terminal voltage of the battery when the battery is fully charged. A problem arises in detecting the exact end point of the charging operation because the full charge time varies with the residual capacity of the battery. In a specific rapid charger, the charge time is determined such that at the time the charging started some amount of current is discharged to detect voltage drops at the battery terminals, and the charge time is determined in accordance with an internal charging program. This method is unreliable because fall charging of a battery can not be assured during the preset charging time, since aging of the battery is not considered. If the battery to be charged is not made by the manufacturer of the charger, the full charge time can not be uniformly obtained for other types of batteries. Therefore, since the terminal voltage of the battery being charged varies with the residual capacity and degree of aging of the battery, conventional battery chargers have sought a compromise between the rapid fall charging and the protection of the batteries.

Figure 2:
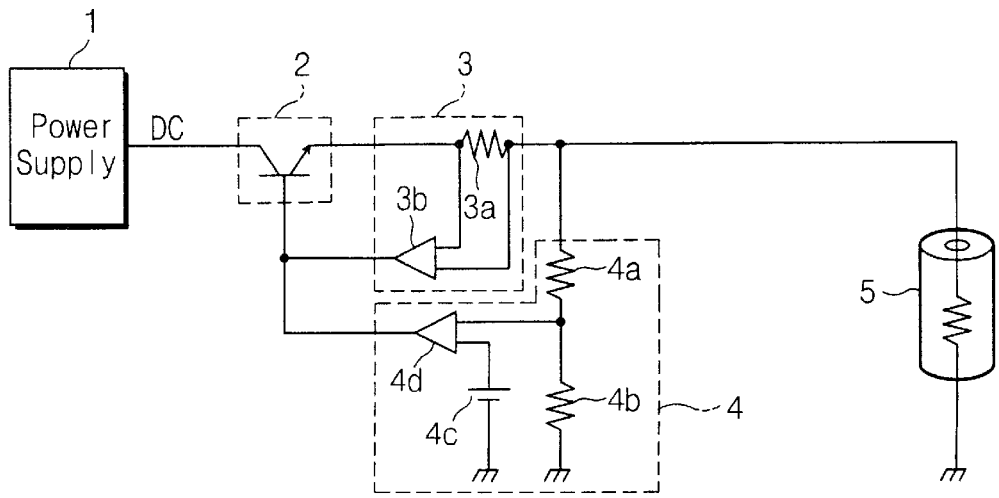
FIG. 2 is a circuit schematic diagram depicting a conventional battery charging apparatus capable of operating in the constant current and constant voltage charging mode.

A conventional charger for charging a Li-ion battery by using both a constant current charging process and a constant voltage charging process is exemplified by FIG. 2. A power supply 1, a switching regulator 2, a constant current control circuit 3, and a constant voltage control circuit 4 are provided for charging the Li-ion battery 5. The power supply 1 includes, although it is not shown, a transformer for converting AC outlet power into the required amplitudes of voltage, a rectifying and smoothing circuit for providing the DC power sources, and a voltage regulator for supplying stable DC output voltages. The power supply 1 may include switching regulator 2. The constant current control circuit 3 includes a current detection resistor 3a coupled at the power supply line to the positive terminal of battery 5, and operational amplifier 3b for detecting the voltage drop within preset voltage range produced when the maximum current is applied to resistor 3a during a rapid charging operation. Constant voltage control circuit 4 includes divider resistors 4a, 4b for obtaining a divided voltage from the battery power supply line, a reference voltage capacitor 4c, and an operational amplifier 4d comparing the divided voltage with the reference voltage and producing a constant voltage control signal to be supplied to switching regulator 2.

Although this convertible type of battery charger supplies a charging current to the battery controlling the current or voltages between the output of switching regulator 2 and battery 5, it always performs a constant voltage charging operation which unnecessarily consumes electrical power. When a Li-ion battery is being charged, the constant voltage charging mode is only necessary for supplemental charging occurring subsequent to the constant current charging. The constant voltage control circuit for the charger is apt to be damaged by occurrence of static, noise or electrical surges when the battery pack is mounted on or detached from an electrical appliance.

Turning now to FIG. 3 to FIG. 9 inclusive, a battery charging circuit constructed according to the principles of the present invention can have a constant current charging control circuit 20 converting the charging current supplied to the battery into a voltage signal and applying the voltage signal to a feedback input terminal FB of the switching regulator 10 in response to a charging speed control signal F_Q applied to fast/quick charging control circuit 50. A constant voltage charging control circuit 80 generates a control signal to feedback input terminal FB for controlling constant voltage charging when the voltage level of the battery has reached a preset voltage level, whereby a constant voltage charging is possible during the constant current charging operation in response to a charging mode selection signal CHG_MOD. Charging speed control signal F_Q and the charging mode selection signal CHG_MOD, as well as a charging enable signal CHG_EN are supplied by a microcomputer 90 incorporated into the charging circuit. Microcomputer 90 produces the charging mode selection signal CHG_MOD when it detects that the charging voltage of the battery during the constant current mode has reached a preset level, in order to convert the charging mode into the constant voltage mode. Charging enable signal CHG_EN is produced by microcomputer 90 in response to the signal A_IN representing the point of time when the power is supplied from the adapter of the power supply circuit (not shown) is input, in order to permit the switching regulator 10 to start the charging operation. Charging speed control signal F_Q is produced to enable the switching regulator 10 to initiate a quick charging operation.

EMBODIMENT 1

Figure 3:
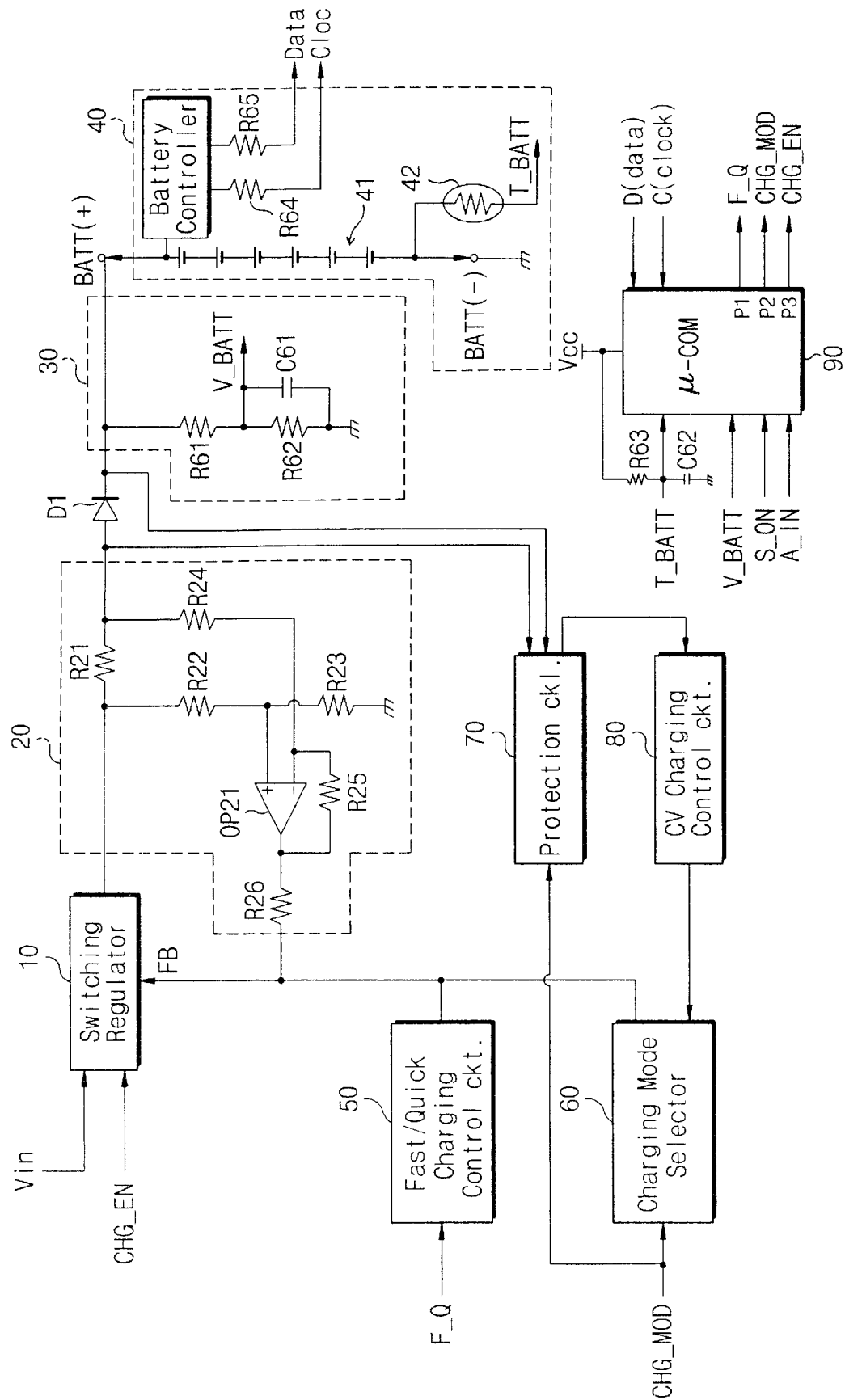
FIG. 3 is a schematic block diagram depicting one embodiment of a battery charging s apparatus having a charging mode change function, constructed in accordance with the principles of the present invention.

Referring to FIG. 3, there is shown a configuration of a battery charging circuit having a charging mode convertible function constructed as one embodiment of the present invention. The battery charging circuit uses a switching regulator 10 for producing DC output required for charging the battery from a DC power source, a constant current charging control circuit 20 detecting the current of the DC output provided by the switching regulator 10 to produce a charging control signal, a battery detection circuit 30 for detecting the charged voltage and the temperature of the battery 40, a fast/quick charging control circuit 50 enabling the charging operation to be performed in fast charging mode or quick charging mode in response to the charging speed control signal F_Q. Further included is a constant voltage charging control circuit 80 outputting a control signal to the feedback input terminal for controlling constant voltage charging if the battery voltage level has reached a preset voltage level, a protection circuit 70 for preventing the constant voltage charging control circuit 80 from being damaged by the excessive surge voltage, and a charging mode selection circuit 60 for enabling the constant voltage charging control circuit 80 in response to the charging mode selection signal CHG_MOD.

The battery pack 40 has a plurality of battery cells 41 which can be any type of rechargeable battery. However, the charging circuit of the invention is preferable to use with the Li-ion battery. Usually, the Li-ion battery pack 40 has a temperature sensing terminal T_BATT for sensing surface temperature of the battery cells, coupled with the negative terminal BATT(−) of the battery pack 40 via a thermistor 42. Also, the battery pack 40 has a battery controller having data and clock terminals for sensing types of battery material, coupled with the positive power terminal BATT(+) via a full-up resistors R65 and R64, respectively. In the event that the battery pack 40 has so called smart battery as wellknown in the art, the battery controller is composed of a microcomputer.

Further, the battery detection circuit 30 includes a divider resistors R61, R62 coupled with the power supply line led from the output of the switching regulator 10 through a diode D 1. Battery voltage detection terminal V_BATT is provided at the junction point of the two resistors R6 1, R62. The battery detection circuit 30 further includes a microcomputer 90 having inputs for receiving signals from the above-mentioned terminals T_BATT, V_BATT, Data, and Clock. The microcomputer 90 has outputs for providing control signals F_Q, CHG_MOD, and CHG_EN with the fast/quick charging control circuit 50, the charging mode selection circuit 60, and the switching regulator 10, in response to the input signals, respectively.

The microcomputer 90 determines the battery charging state from the voltage level of the V_BATT terminal and the battery type from the Data and Clock terminals. If the Data terminal is corresponding to logic low level and the Clock terminal is logic high, the microcomputer 90 regards the battery pack 40 as a Ni-MH or Ni-Cd battery. Otherwise, if the Date terminal is high and the Clock terminal is low, a Li-ion battery is found.

The constant current charging control circuit 20 is provided to operate such that the DC output is produced in a PWM (Pulse Width Modulation) form in response to the voltage variation detected at the resistor R21 provided in the DC output line of the switching regulator 10. The detected voltage of the resistor R21 is amplified at the operational amplifier OP21 as much as the voltage gain thereof. There, the DC output voltage is applied to the divider resistor R22, R23 and the divided voltage is applied to the non-inverting input of the operational amplifier OP21 and the detected voltage at the resistor R21 is applied to the inverting input of the operational amplifier OP21 through the resistor R24.

Figure 4:
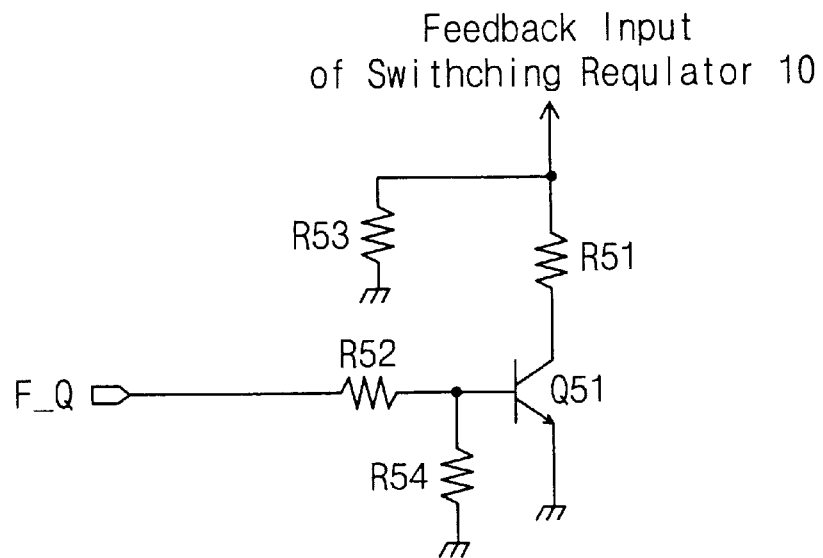
FIG. 4 is a detailed circuit schematic diagram showing the fast/quick charging control circuit of the battery charging apparatus shown in FIG. 3.

The details of the fast/quick charging control circuit 50 of the battery charging apparatus is shown in FIG. 4. The fast/quick charging control circuit 50 includes a transistor Q5 1; the base thereof is connected with the charging speed control signal input FQ via resistors R52 and R54, and the collector with the feedback input of the switching regulator 10 via resistors R5 1 and R53. The emitter of the transistor Q51 is grounded. In response to high level input of the charging speed control signal F_Q, the transistor Q51 will be turn on and switch the collector terminal to the ground, which disables the applying of a quick charging signal to the feedback input of the switching regulator 10 and enables the regulator 10 to operate in a normal charging operation. Otherwise, at the low level input control signal F_Q, the transistor Q51 will be turn off and the switching regulator 10 performs quick charging operation in response to the output voltage of the constant current charging control circuit 20.

The feedback input terminal FB of the switching regulator 10 is set to the reference voltage of 1.24 Volts. Thus, the switching regulator 10 turns on the switching transistor (not shown) until the feedback input terminal FB reaches the reference voltage by the supplying voltage from the constant current charging control circuit 20. And if the voltage of feedback input terminal FB exceeds the reference voltage, the switching transistor will be turned off. Like this, the charging current generated by the repeat of turn on/off of the switching transistor of the switching regulator 10 is applied to the battery 40 and the quick charging can be achieved.

Meanwhile, when the charging speed control signal F_Q becomes high level and the transistor Q51 is turned on, the output level of the constant current charging control circuit 20 will be lowered due to the resistors R5 1, R53. This will continue the turn on state of the switching transistor of the switching regulator 10 until the feedback input terminal FB reaches the reference voltage (1.24 Volts) and permits flow of much charging current to the battery 40.

Specifically, when the transistor Q51 of the fast/quick charging control circuit 50 is turned on, the voltage Vfbf applied to the feedback input terminal FB of the switching regulator 10 can be obtained by the following equation:

$$Vfbf = \frac{Va \times \frac{R53 \times R51}{R53 + R51}}{R26 + \frac{R53 \times R51}{R53 + R51}} \qquad (1)$$

where, Va means an output voltage of the operational amplifier OP21 of the constant current charging control circuit 20.

Further, when the transistor Q51 is turned off, the voltage Vfbq applied to the feedback input FB of the switching regulator 10 can be obtained by the following equation:

$$Vfbq = \frac{Va \times R53}{R26 + R53} \qquad (2)$$

Where, Va means an output voltage of the operational amplifier OP21 of the constant current charging control circuit 20.

In this circuit, the voltage Vfbf is normally larger than the voltage Vfbq, however, since the reference voltage of the feedback input terminal FB should be 1.24 Volts, the constant current outputted in the fast charging mode is larger than that of in the quick charging mode.

Figure 5:
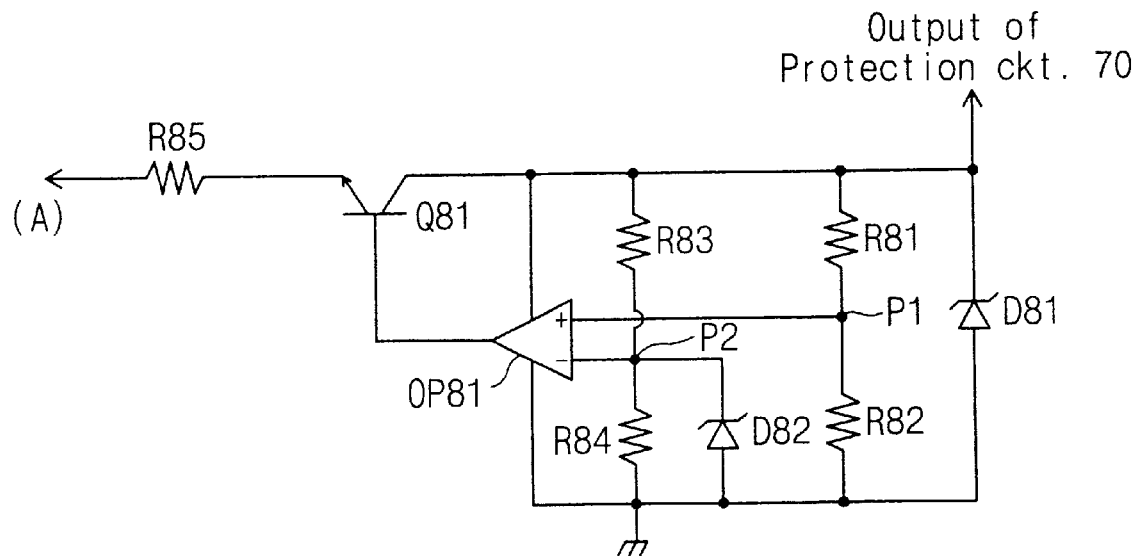
FIG. 5 is a detailed circuit schematic diagram showing the constant voltage charging control circuit of the apparatus shown in FIG. 3.

The detailed configuration of the constant voltage charging control circuit 80 of the apparatus is shown in FIG. 5. There, the constant voltage charging control circuit 80 includes an operational amplifier OP81 that functions as a comparator, and a switching transistor Q81. The non-inverting input of the operational amplifier OP81 is connected with a divider resistors R81, R82 for supplying with the divided charging voltage fed from the output of the protection circuit 70, and the inverting input is connected with another divider resistors R83, R84. Both ends of the serial divider resistors R8 1, R82 are connected parallel with a Zener diode D81. This diode D81 will prevent the constant voltage charging control circuit 80 from being damaged by inputting of an excessive static or surge voltage. Also, at both ends of the resistor R84, i.e., between the inverting input of the comparator OP81 and the ground terminal, there is provided another Zener diode D82 to supply a reference voltage.

In this circuit 80, if the charging voltage divided by the resistors R81, R82 is lower than the reference voltage provided by the Zener diode D82, the comparator OP81 produces a low level output and thus the transistor Q81 will be turned off. This represents that the charged voltage at the battery 40 has not reached a desired level, for example in case of a Li-ion battery, 4.1 or 4.2 Volts/cell. On the other hand, if the charged voltage at the battery 40 reached above the desired level, the comparator OP81 produces a high level output that allows the transistor Q81 to be turned on. Thus, charging voltage is supplied through the transistor Q81 with an input A of the charging mode selection circuit 60, and then applied to the feedback input terminal of the switching regulator 10 to increase voltage level applied to the feedback input terminal FB. Therefore, the constant current charging operation is converted into the constant voltage charging mode.

Figure 6:
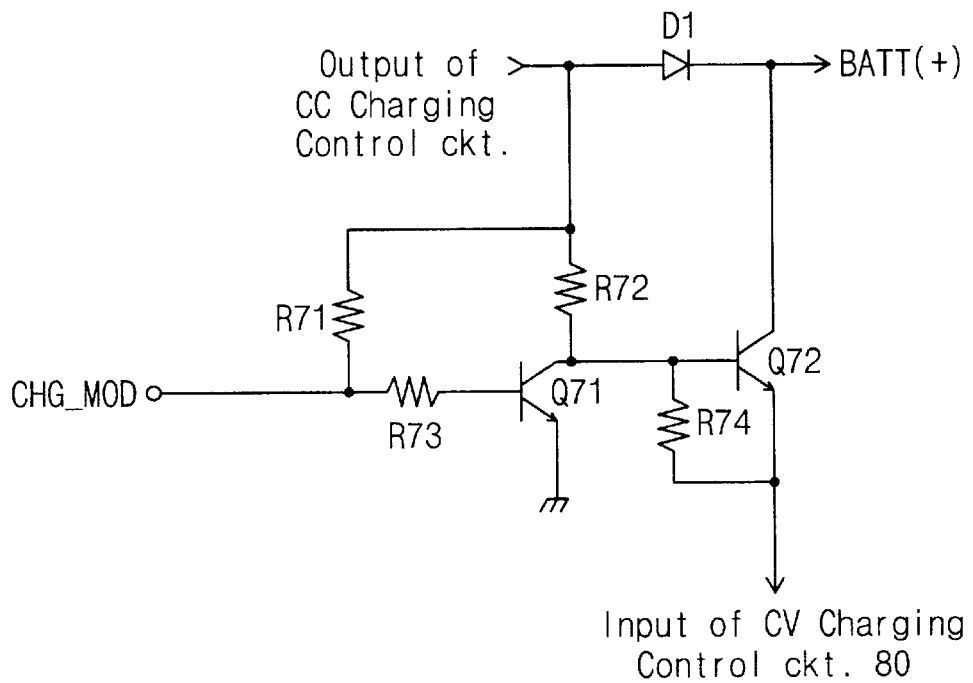
FIG. 6 is a detailed circuit schematic diagram showing the protection circuit of the battery charging apparatus shown in FIG. 3.

The protection circuit 70 of the battery charging apparatus includes a signal input CHG_MOD connected to an output of the microcomputer 90 and two voltage inputs connected to the output of the constant current (CC) charging control circuit 20 and the output of the diode D 1 of the power supply line led to the battery pack 40, as shown in FIG. 6. Further, the protection circuit 70 consists of a transistor Q71 and Q72, and related biasing resistors R71 to R74. The signal input terminal CHG_MOD is connected to the base of the transistor Q71 via the resistor R73 and the two power supply inputs are connected with the collector of the transistor Q71 via the resistor R72 and with the collector of the transistor Q72. There, the collector output of the transistor Q71 is connected to the base input of the transistor Q72. And the emitter of the transistor Q71 is grounded and the emitter of the transistor Q72 is connected with an input of the constant voltage (CV) charging control circuit 80. Also, a resistor R7 1 is connected between the signal input terminal CHG_MOD and the output of the CC charging control circuit 20. The resistor 74 is connected between the base and emitter of the transistor Q72.

Figure 7:
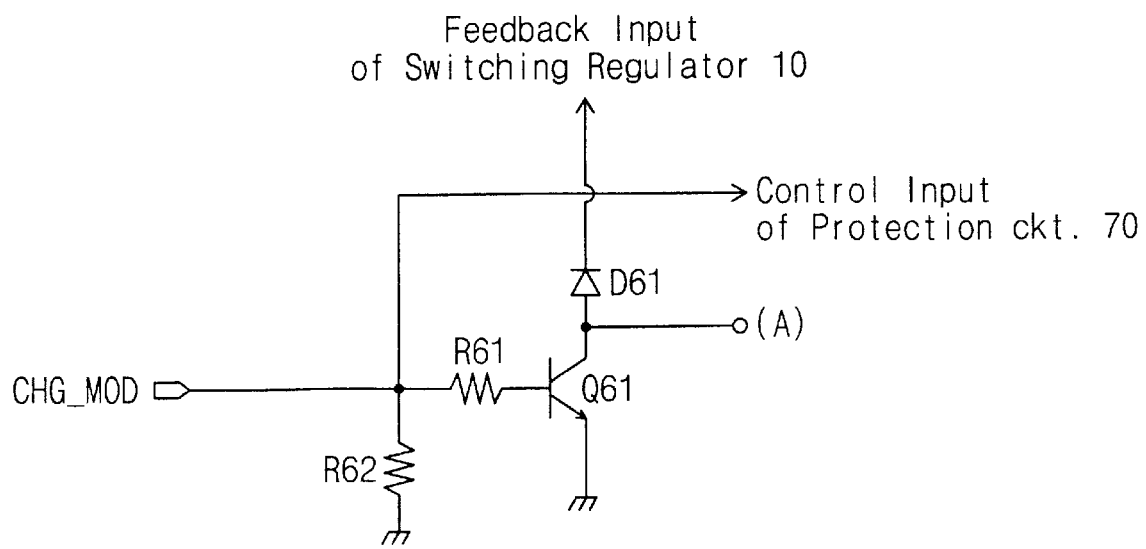
FIG. 7 is a detailed circuit schematic diagram showing the charging mode selection circuit of the battery charging apparatus shown in FIG. 3.

As shown in FIG. 7, the charging mode selection circuit 60 includes a transistor Q61, a base biasing resistor R61, and a diode D61. The base of the transistor Q61 is connected with the charging mode selection signal line CHG_MOD, and the collector of the transistor Q61 is connected with the output terminal A of the CV charging control circuit 80 as well as the feedback input of the switching regulator 10 via the diode D61.

In operation, when the battery 40 is coupled with the charging circuit of this invention, the charging operation proceeds at the constant current mode with the charging mode selection signal CHG_MOD being maintained at logic high level. The microcomputer 90 detects the charging state of the battery from the voltage level at the terminal V_BATT of the battery detection circuit 30. If the charged voltage exceeds the preset voltage level, or the detected voltage and temperature level, etc. are corresponding to the preset transition condition in case of the Li-ion battery, the microcomputer 90 produces a low level charging mode selection signal CHG_MOD to convert the charging mode into the constant voltage mode. At this time, the low level signal CHG_MOD is applied to the base of the transistor Q71 of the protection circuit 70, which permit the transistor Q71 to be turned off and the transistor Q72 on. The low level charging mode selection signal CHG_MOD is also applied to the base of the transistor Q61 of the charging mode selection circuit 60, which turns off the transistor Q6 1. This result in supplying of the charging voltage at the power supply line with the CV charging control circuit 80.

As previously mentioned, the CV charging control circuit 80 receives the charging voltage supplied with the battery 40 when the charged voltage reached above the desired level, and the charging voltage is supplied through the resistor R85 with an input A of the charging mode selection circuit 60, and then applied to the feedback input terminal of the switching regulator 10, in order to increase voltage level at the feedback input terminal PB. Therefore, the constant current charging operation that proceeded in the switching regulator 10 is changed to the constant voltage charging mode.

More specifically, in the charging mode selection circuit 60, when the charging mode selection signal CHG_MOD is in the high level, the transistor Q61 will be turned on and the anode of the diode D61, i.e., collector of the transistor Q61 is grounded. Thus, the diode D61 interrupts the output of the CV charging control circuit 80, and the output voltage of the CV charging control circuit 80 does not affect the output of the CC charging control circuit 20.

In the above arrangement, the CV charging mode can be carried out when the battery is found to be in the preset condition, regardless of type of the batteries. In addition, by provision of the protection circuit 70, the possible damage of the CV charging control circuit 80 due to the excessive static or surge is effectively prevented.

Figure 8:
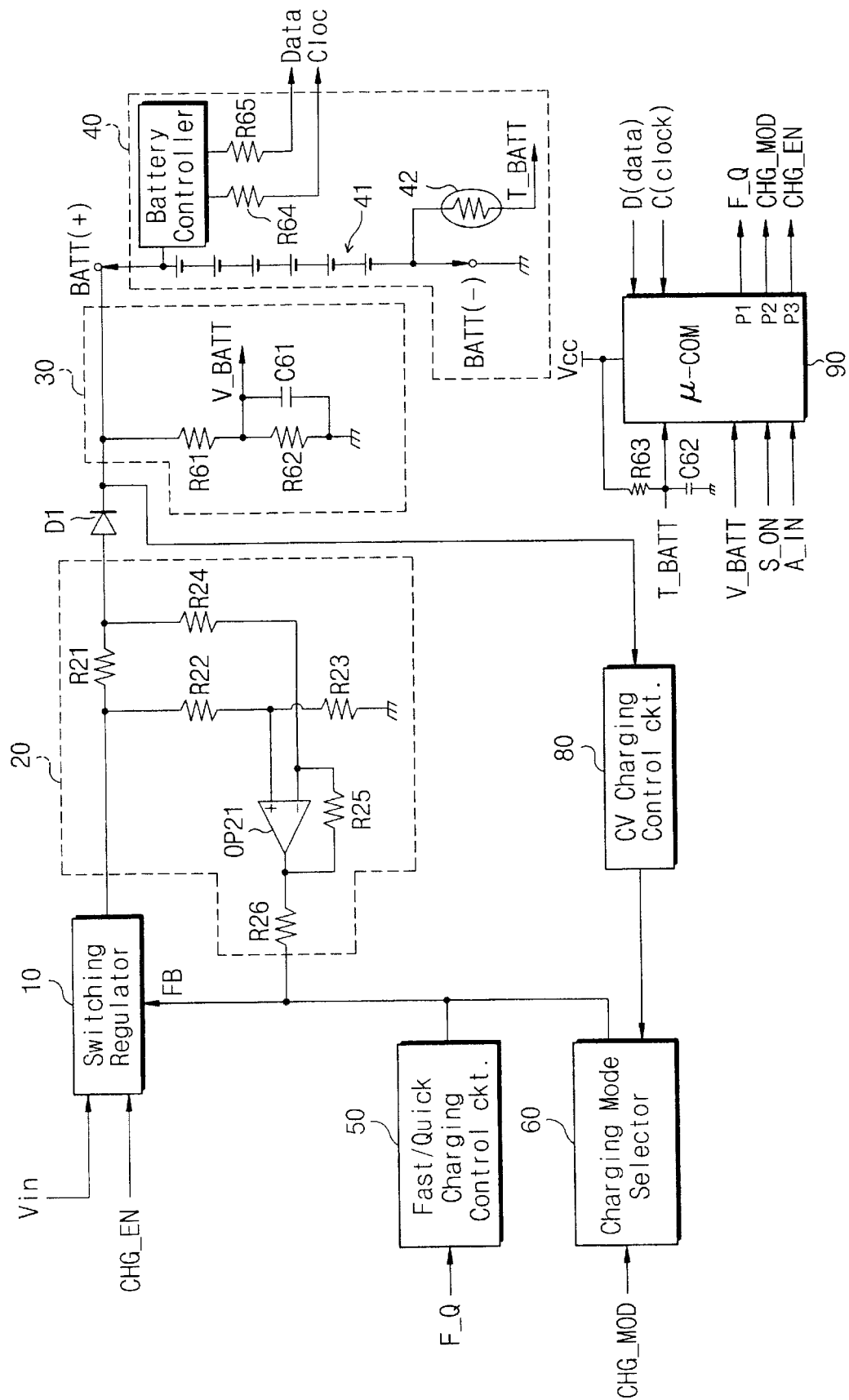
FIG. 8 is a schematic block diagram depicting another embodiment of a battery charging apparatus constructed in accordance with the principles of the present invention.
Figure 9:
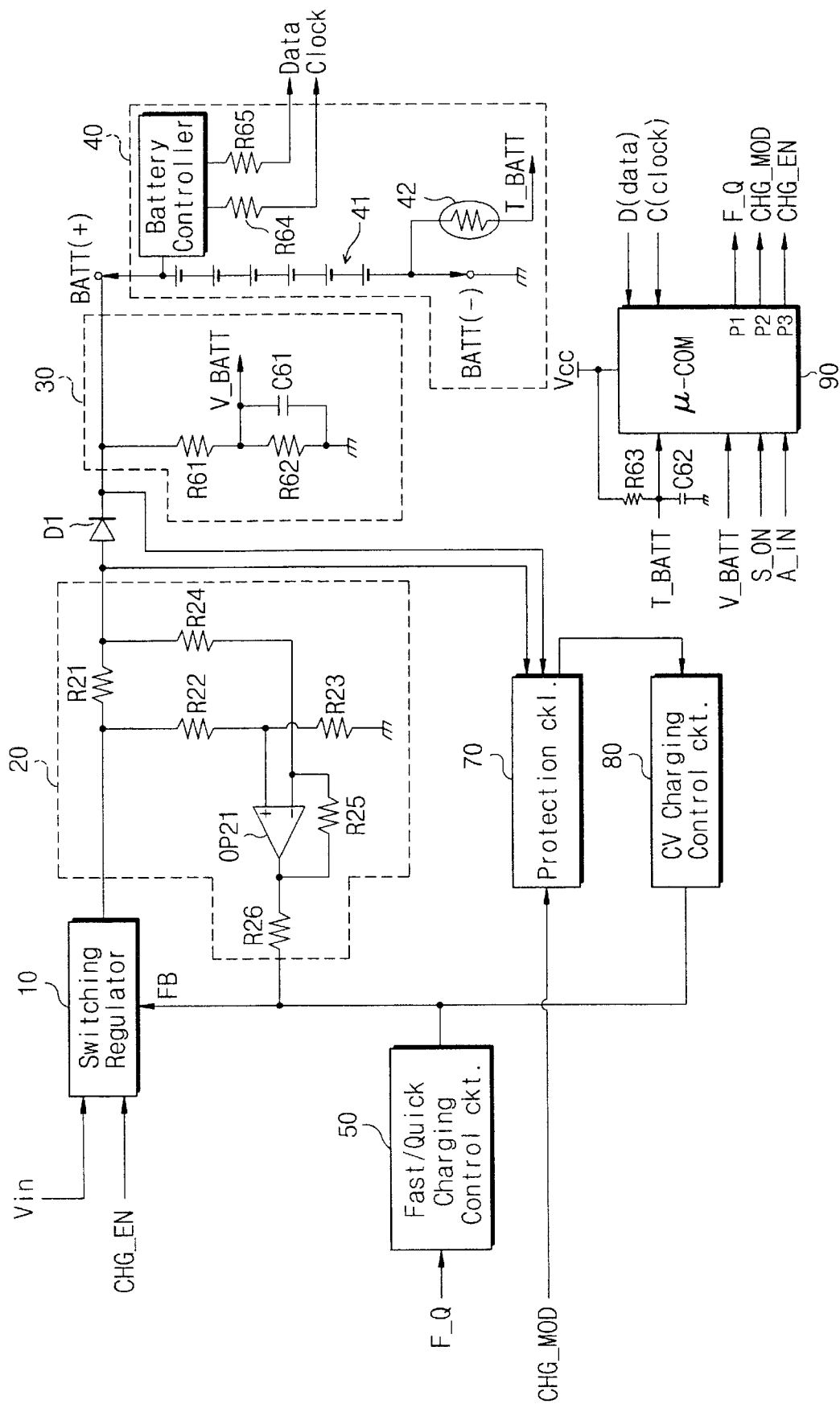
FIG. 9 is a schematic block diagram depicting another embodiment of a battery charging apparatus constructed in accordance with the principles of the present invention.

FIG. 8 and 9 show another embodiments of the battery charging apparatus in accordance with the present invention. Also, in FIG. 8 and FIG. 9, all of the constituents having the same configuration and performing the same functions as those illustrated in FIG. 3 shall have the same reference numbers.

EMBODIMENT 2

Briefly, the circuit configuration of the battery charging apparatus shown in FIG. 8 is the same as those in FIG. 3 except omission of the protection circuit block 70. Therefore, the output of the CC charging control circuit 20 providing a charging voltage for the battery 40 is directly connected with the input of the CV charging control circuit 80.

The operation is similar with that of the first embodiment. That is, when the battery 40 is coupled with the charging circuit shown in FIG. 8, the charging operation is proceeded at the constant current mode with the charging mode selection signal CHG_MOD being maintained at logic high level. The microcomputer 90 detects the charging state of the battery from the voltage level at the terminal V_BATT of the battery detection circuit 30. If the charged voltage exceeds the preset voltage level, or the detected voltage and temperature level, etc. are corresponding to the preset transition condition especially provided for the Li-ion battery, the microcomputer 90 produces a low level charging mode selection signal CHG_MOD to convert the charging mode into the constant voltage mode.

At this time, the low level charging mode selection signal CHG_MOD is applied to the base of the transistor Q61 of the charging mode selection circuit 60, which turns off the transistor Q61. This result in supplying of the charging voltage at the power supply line with the CV charging control circuit 80.

The CV charging control circuit 80 receives the charging voltage supplied with the battery 40 when the charged voltage reached above the desired level, and the charging voltage is supplied through the resistor R85 with an input A of the charging mode selection circuit 60, and then applied to the feedback input terminal of the switching regulator 10, in order to increase voltage level at the feedback input terminal FB. Thus, the constant current charging operation that proceeded in the switching regulator 10 is changed to the constant voltage charging mode.

With this arrangement, the CV charging mode can be carried out at the preset condition, regardless of type of batteries, that is the charging voltage of the battery and the surface temperature of the battery, etc. reached a preset level.

EMBODIMENT 3

FIG. 9 illustrates the third embodiment of the battery charging apparatus according to the present invention. Briefly, the circuit configuration of the battery charging apparatus shown in Fig. 9 is the same as those in FIG. 3 except omission of the charging mode selection circuit 60 which enables the switching regulator to operate in the constant voltage mode other than the constant current mode. Therefore, it is configured so that the charging mode selection signal CHG_MOD supplied from the microcomputer 90 can safely be applied to the input of the protection circuit 70, and the output of the CV charging control circuit 80 is directly connected with the feedback input terminal of the switching regulator 10 together with the output of the CC charging control circuit 20.

In operation, similar with that of the first embodiment, when the battery 40 is coupled with the charging circuit shown in FIG. 9, the charging operation is proceeding at the constant current mode with the charging mode selection signal CHG_MOD being maintained at logic high level. The microcomputer 90 detects the charging state of the battery from the voltage level at the terminal V_BATT of the battery detection circuit 30. If the charged voltages exceed the preset voltage level, or the detected voltage and temperature level, etc. are corresponding to the preset transition condition especially provided for the Li-ion battery, the microcomputer 90 produces a low level charging mode selection signal CHG_MOD to convert the charging mode into the constant voltage mode.

At this time, the low level signal CHG_MOD is applied to the base of the transistor Q71 of the protection circuit 70, which permits the transistor Q71 to be turned off and the transistor Q72 on. This result in supplying of the charging voltage at the power supply line with the CV charging control circuit 80. The CV charging control circuit 80 receives the charging voltage when the charged voltage at the battery 40 reached above the desired level, and then the charging voltage is supplied through the resistor R85 with the feedback input terminal of the switching regulator 10, in order to increase voltage level at the feedback input terminal FB. Therefore, the constant current charging operation that proceeded in the switching regulator 10 is changed to the constant voltage charging mode. In the meantime, when the charging mode selection signal CHG_MOD maintains the high level, the CV charging control circuit 80 will not operate when the battery pack 40 is mounted in the charging circuit.

With the above arrangement, the CV charging operation can be carried out when the battery is found to be charged in the CV charging mode, especially the Li-ion battery is used in the charging circuit of this invention. In addition, by provision of the protection circuit 70, the possible damage of the CV charging control circuit 80 due to the excessive static or surge is effectively prevented. While the invention has been described in terms of an exemplary embodiment, it is contemplated that it may be practiced as outlined above with modifications within the spirit and scope of the appended claims.

What is claimed is:

1. A battery charging apparatus for charging at least one battery in at least one of a constant current mode and a constant voltage mode, comprising:

a switching regulator for generating a switching voltage from a DC voltage source;

a constant current charging control means for detecting a current of a DC output provided by the switching regulator to produce a charging control signal for enabling the switching regulator to operate in the constant current mode;

a battery detection means for detecting a voltage level of the at least one battery;

a control means for producing a charging mode selection signal CHG_MOD, a charging speed control signal F_, and a charging enable signal CHG_EN in response to the voltage level detected from the battery detection means, the charging enable signal CHG_EN for permitting the switching regulator to start charging for the at least one battery, said control means for producing the charging mode selection signal CHG_MOD to convert from charging in the constant current mode to charging in the constant voltage mode without interruption of charging in the constant current mode to determine if at least one of a preset voltage level and a preset charging condition has been reached;

a charging speed control means for enabling the switching regulator to perform a fast charging operation in response to an input level of the charging speed control signal F_Q;

a constant voltage charging control means for outputting a control signal to a feedback input terminal of the switching regulator in response to the charging mode selection signal CHG_MOD to operate the switching regulator in the constant voltage mode if at least one of the voltage level of the at least one battery has reached the preset voltage level an the preset charging condition has been reached;

a protection means for preventing the constant voltage charging control means from being damaged by an excessive surge voltage; and a charging mode selection means for enabling the constant voltage charging control in response to the charging mode selection signal CHG_MOD.

2. The battery charging apparatus as claimed in claim 1, wherein the battery detection means includes a temperature sensing means for detecting a surface temperature of the at least one battery.

3. The battery charging apparatus as claimed in claim 1, wherein the constant current charging control means enables the switching regulator to generate an output charging voltage in the pulse width modulation PWM mode in response to a switching output voltage of the switching regulator.

4. The battery charging apparatus as claimed in claim 3, wherein the constant current charging control means includes a resistor for detecting an output current of the switching regulator applied to the at least one battery, and a comparator for amplifying a voltage drop at the resistor as much as the voltage gain at the resistor and for supplying an amplified voltage with the feedback input terminal of the switching regulator.

5. The battery charging apparatus as claimed in claim 1, wherein the charging speed control means grounds the an output of the constant current charging control means in response to the input level of the charging speed control signal P_Q, and disables the fast charging operation of the switching regulator.

6. The battery charging apparatus as claimed in claim 5, wherein the charging speed control means includes a switching transistor, a base thereof of the switching transistor is connected with a charging speed control signal F_Q in via resistors, and a collector of the switching transistor is connected with the feedback input terminal of the switching regulator.

7. The battery charging apparatus as claimed in claim 1, wherein the control means produces a first charging mode selection signal at an initial charging state and a second charging mode selection signal for converting a charging mode into the constant voltage mode when the voltage level of the at least one battery has reached the preset voltage level.

8. The battery charging apparatus as claimed in claim 1, wherein the constant voltage charging control means includes a voltage divider for detecting a charging voltage of the at least one battery, a reference voltage generator for providing a reference voltage, a comparator for producing a mode converting signal when a divided voltage from the voltage divider is higher than the reference voltage, and a transistor for providing the charging voltage with the feedback input terminal of the switching regulator in response to the mode converting signal.

9. The battery charging apparatus as claimed in claim 8, further including a zener diode parallel connected with the voltage divider for protecting an excessive static and surge introduced by a charging voltage input line.

10. The battery charging apparatus as claimed in claim 1, wherein the protection means includes a first transistor switched on in response to a high level signal of the charging mode selection signal CHG_MOD, and a second transistor switched on in response to a turn on state of the first transistor for providing a charging voltage with the constant voltage charging control means.

11. The battery charging apparatus as claimed in claim 1, wherein the at least one battery includes at least one of Ni-MH and Ni-Cd type batteries.

12. The battery charging apparatus as claimed in claim 1, wherein the charging mode selection means includes a transistor for selectively connecting and disconnecting an output of the constant voltage charging control means with the feedback input terminal of the switching regulator in response to the charging mode selection signal CHG_MOD.

13. The battery charging apparatus as claimed in claim 12, wherein the charging mode selection means further includes a diode for blocking a current flow from an output of the constant current charging control means to the output of the constant voltage charging control means.

14. A battery charging apparatus for charging at least one battery in at least one of a constant current mode and a constant voltage mode, comprising:

a switching regulator for generating a switching voltage from a DC voltage source;

a constant current charging control means for detecting a current of a DC output provided by the switching regulator to produce a charging control signal for enabling the switching regulator to operate in the constant current mode;

a battery detection means for detecting a voltage level of the at least one battery;

a control means for producing a charging mode selection signal CHG_MOD, a charging speed control signal F_Q, and a charging enable signal CHG_LEN in response to the voltage level detected from the battery detection means, the charging enable signal CHG_EN for permitting the switching regulator to start charging for the at least one battery, said control means for producing the charging mode selection signal CHG_MOD to convert from charging in the constant current mode to charging in the constant voltage mode without interruption of charging in the constant current mode to determine if at least one of a preset voltage level and a preset charging condition has been reached;

a charging speed control means for enabling the switching regulator to perform a fast charging operation in response to an input level of the charging speed control signal F_Q;

a constant voltage charging control means for outputting a control signal to a feedback input terminal of the switching regulator in response to the charging mode selection signal CHG_MOD to operate the switching regulator in the constant voltage mode if at least one of the voltage level of the at least one battery has reached the preset voltage level and the preset charging condition has been reached; and a charging mode selection means for enabling the constant voltage charging control means in response to the charging mode selection signal CHG_MOD.

15. The battery charging apparatus as claimed in claim 14, wherein the constant voltage charging control means includes a voltage divider for detecting a charging voltage of the at least one battery, a reference voltage generator for generating a reference voltage, a comparator for producing a mode converting signal when a divided voltage from the voltage divider is higher than the reference voltage, and a transistor for providing the charging voltage with the feedback input terminal of the switching regulator in response to the mode converting signal.

16. The battery charging apparatus as claimed in claim 14, wherein the charging mode selection means includes a transistor for selectively connecting and disconnecting an output of the constant voltage charging control means with the feedback input terminal of the switching regulator in response to the charging mode selection signal CHG_MOD.

17. A battery charging apparatus for charging at least one battery in at least one of a constant current mode and a constant voltage mode, comprising:

a switching regulator for generating a switching voltage from a DC voltage source;

a constant current charging control means for detecting a current of a DC output provided by the switching regulator to produce a charging control signal for enabling the switching regulator to operate in the constant current mode;

a battery detection means for detecting a voltage level of the at least one battery;

a control means for producing a charging mode selection signal CHG_MOD, a charging speed control signal F_Q, and a charging enable signal CHG_EN in response to the voltage level detected from the battery detection means, the charging enable signal CHG_EN for permitting the switching regulator to start charging for the at least one battery, said control means for producing the charging mode selection signal CHG_MOD to convert from charging in the constant current mode to charging in the constant voltage mode without interruption of charging in the constant current mode to determine if at least one of a preset voltage level and a preset charging condition has been reached;

a charging speed control means for enabling the switching regulator to perform a fast charging operation in response to an input level of the charging speed control signal F_Q;

a constant voltage charging control means for outputting a control signal to a feedback input terminal of the switching regulator in response to the charging mode selection signal CHG_MOD to operate the switching regulator in the constant voltage mode if at least one of the voltage level of the at least one battery has reached the preset voltage level and the preset charging condition has been reached; and a protection means for preventing the constant voltage charging control means from being damaged by an excessive surge voltage.

18. The battery charging apparatus as claimed in claim 17, wherein the constant voltage charging control means includes a voltage divider for detecting a charging voltage of the at least one battery, a reference voltage generator for providing a reference voltage, a comparator for producing a mode converting signal when a divided voltage from the voltage divider is higher than the reference voltage, and a transistor for providing the charging voltage with the feedback input terminal of the switching regulator in response to the mode converting signal.

19. The battery charging apparatus as claimed in claim 17, wherein the protection means includes a first transistor switched on in response to a high level signal of the charging mode selection signal CHG_MOD, and a second transistor switched on in response to a turnon state of the first transistor for providing a charging voltage with the constant voltage charging control means.

20. A method for charging at least one battery in at least one of a constant current mode and a constant voltage mode, comprising the steps of:

generating by a switching regulator a switching voltage from a DC voltage source;

detecting a current of a DC output provided by the switching regulator to produce a charging control signal for enabling the switching regulator to operate in the constant current mode;

detecting a voltage level of the at least one battery;

producing a charging mode selection signal CHG_MOD, a charging speed control signal F_Q, and a charging enable signal CHG_EN in response to the voltage level detected, the charging enable signal CHG_EN permitting the switching regulator to start charging the at least one battery;

operating in the constant current mode to charge the at least one battery, if the charging control signal is produced;

producing the charging mode selection signal CHG_MOD to convert from charging in the constant current mode to charging in the constant voltage mode without interruption of charging in the constant current mode to determine if at least one of a preset voltage level and a preset charging condition has been reached;

enabling the switching regulator to perform a fast charging operation dependent upon an input level of the charging speed control signal F_Q; and operating the switching regulator in the constant voltage mode, in response to the charging mode selection signal CHG_MOD, if at least one of the voltage level of the at least one battery has reached the preset voltage level and the preset charging condition has been reached.

* * * * *